United States Patent
Sgambati et al.

(10) Patent No.: US 10,570,781 B2
(45) Date of Patent: Feb. 25, 2020

(54) CONNECTION SYSTEM FOR CONDENSER AND STEAM TURBINE AND METHODS OF ASSEMBLING THE SAME

(71) Applicant: General Electric Technology GmbH, Baden (CH)

(72) Inventors: Alessandro Sgambati, Möhlin (CH); Thomas Griesser, Klettgau-Bühl (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 125 days.

(21) Appl. No.: 15/922,464

(22) Filed: Mar. 15, 2018

(65) Prior Publication Data
US 2019/0285120 A1    Sep. 19, 2019

(51) Int. Cl.
| | |
|---|---|
| *F01K 11/02* | (2006.01) |
| *F16B 2/06* | (2006.01) |
| *F16B 5/06* | (2006.01) |
| *F01K 9/00* | (2006.01) |
| *F28B 3/04* | (2006.01) |

(52) U.S. Cl.
CPC ............ *F01K 11/02* (2013.01); *F16B 2/065* (2013.01); *F16B 5/0692* (2013.01); *F01K 9/003* (2013.01); *F28B 3/04* (2013.01)

(58) Field of Classification Search
USPC .................................................. 60/685, 687
See application file for complete search history.

(56) References Cited

U.S. PATENT DOCUMENTS

| | | | | |
|---|---|---|---|---|
| 2,603,953 | A | | 7/1952 | Wilson |
| 4,186,949 | A | * | 2/1980 | Bartha ................... F16L 27/108 285/226 |
| 4,378,176 | A | * | 3/1983 | Puccio .................... E01D 19/06 404/15 |
| 5,228,255 | A | * | 7/1993 | Hahn ..................... F16L 51/022 277/316 |
| 5,716,158 | A | * | 2/1998 | Hahn ..................... F16B 5/0692 285/187 |
| 5,961,244 | A | * | 10/1999 | Hahn ....................... F01K 11/02 403/291 |
| 6,259,165 | B1 | | 7/2001 | Brewington |
| 8,286,430 | B2 | | 10/2012 | Swintek et al. |

(Continued)

FOREIGN PATENT DOCUMENTS

| | | |
|---|---|---|
| EP | 587363 A2 | 3/1994 |
| WO | 2009082372 A1 | 7/2009 |

*Primary Examiner* — Matthew P Travers
(74) *Attorney, Agent, or Firm* — Armstrong Teasdale LLP

(57) ABSTRACT

A connection system for coupling a steam turbine to a condenser is provided. The connection system includes a dog-bone connector, a first clamp, and a second clamp. The dog-bone connector includes a first end, a second end opposite the first end with respect to the third direction, and a body extending therebetween. The first clamp includes a first portion, a second portion coupled to the first portion, and a first retention cavity defined therebetween. The first clamp is configured to couple to one of the steam turbine and the condenser such that the first portion is movable relative to the second portion along the third direction. The second clamp is configured to couple to the other of the steam turbine and the condenser and includes a third portion, a fourth portion coupled to the third portion, and a second retention cavity defined therebetween.

16 Claims, 7 Drawing Sheets

(56) References Cited

U.S. PATENT DOCUMENTS

| | | |
|---|---|---|
| 8,850,816 B2 | 10/2014 | North et al. |
| 9,206,708 B2 | 12/2015 | Moriyama et al. |
| 2005/0198939 A1 | 9/2005 | Hattori et al. |
| 2008/0229682 A1* | 9/2008 | Torsani ................... E01D 19/06 52/167.1 |
| 2010/0050638 A1 | 3/2010 | Ogino et al. |
| 2014/0373533 A1 | 12/2014 | Jensen et al. |
| 2015/0001814 A1* | 1/2015 | Roge ..................... F16J 15/021 277/637 |

* cited by examiner

CONNECTION SYSTEM FOR CONDENSER AND STEAM TURBINE AND METHODS OF ASSEMBLING THE SAME

BACKGROUND

The field of the disclosure relates generally to connection systems for steam turbine systems, and more particularly to systems for connecting a steam turbine to a condenser.

At least some known steam turbine systems include a condenser coupled in downstream flow communication with a steam turbine. For example, at least some known steam turbine systems include a steam turbine that is assembled on a steam turbine table and coupled to a condenser positioned below the table. In at least some cases, a final step in coupling the condenser to the steam turbine includes welding a neck of the condenser to an outer casing of the turbine. However, tolerance stack-up and/or weld shrinkage may cause vertical misalignment of the condenser and turbine casing. In some cases, the condenser, which may have considerable bulk, must be jacked up and levelled to enable the final welding of the joint.

Moreover, the final welding of the joint typically must be performed from inside the joint. Additional work on the steam turbine installation that depends upon the final levelling of the condenser, such as pouring of additional elements of the foundation under the steam turbine table, must be delayed to enable connection of the condenser in the adjusted vertical alignment beneath the turbine. For example, it may require several weeks for elements of the foundation, poured after the coupling of the condenser, to become capable of receiving loading.

BRIEF DESCRIPTION

In one aspect, a connection system for coupling a steam turbine to a condenser is provided. The connection system defines a first direction, a second direction, and a third direction, the three directions orthogonal to each. The connection system includes a dog-bone connector, a first clamp, and a second clamp. The dog-bone connector includes a first end, a second end opposite the first end with respect to the third direction, and a body extending therebetween. The first clamp includes a first portion, a second portion coupled to the first portion, and a first retention cavity defined therebetween. The first retention cavity is contoured complementary to at least a portion of the first end of the dog-bone connector and the first clamp is configured to couple to one of the steam turbine and the condenser such that the first portion is movable relative to the second portion along the third direction. The second clamp is configured to couple to the other of the steam turbine and the condenser and includes a third portion, a fourth portion coupled to the third portion, and a second retention cavity defined therebetween, wherein the second retention cavity is contoured complementarily to the second end of the dog-bone connector.

In another aspect a steam turbine system is provided. The steam turbine system includes a steam turbine, a condenser, and a connection system. The condenser is configured to receive steam exhausted from the steam turbine and includes a condenser neck. The connection system is for coupling the steam turbine to the condenser neck and defines a first direction, a second direction, and a third direction, the three directions orthogonal to each other. The connection system includes a dog-bone connector, a first clamp, and a second clamp. The dog-bone connector includes a first end, a second end opposite the first end with respect to the third direction, and a body extending therebetween. The first clamp includes a first portion, a second portion coupled to the first portion, and a first retention cavity defined therebetween. The first retention cavity is contoured complementary to at least a portion of the first end of the dog-bone connector and the first clamp is configured to couple to one of the steam turbine and the condenser such that the first portion is movable relative to the second portion along the third direction. The second clamp is configured to couple to the other of the steam turbine and the condenser and includes a third portion, a fourth portion coupled to the third portion, and a second retention cavity defined therebetween, wherein the second retention cavity is contoured complementarily to the second end of the dog-bone connector.

In yet another aspect, a method of coupling a steam turbine to a condenser using a connection system is provided. The connection system defines a first direction, a second direction, and a third direction, the three directions orthogonal to each other. The method includes coupling a first clamp to one of the steam turbine and the condenser, wherein the first clamp includes a first portion, a second portion coupled to the first portion, and a first retention cavity defined therebetween, and wherein the first portion is movable relative to the second portion along the third direction. The method also includes coupling a second clamp to the other of the steam turbine and the condenser, wherein the second clamp includes a third portion, a fourth portion coupled to the third portion, and a second retention cavity defined therebetween. The method further includes retaining a second end of the dog-bone connector within the second retention cavity, wherein the dog-bone connector further includes a first end opposite the second end with respect to the third direction, and a body extending therebetween. Finally, the method includes retaining the first end of the dog-bone connector in the first retention cavity.

DETAILED DESCRIPTION

The embodiments described herein overcome at least some of the disadvantages of known connection systems for coupling steam turbines to condensers. The embodiments include a dog-bone connector, a first clamp coupled to one of the steam turbine and the condenser and configured to retain a first end of the dog-bone connector, and a second clamp coupled to the other of the steam turbine and the condenser and configured to retain a second end of the dog-bone connector. A first portion of the first clamp is movable relative to a second portion along one (e.g., vertical) direction, such that a position of the retention cavity for the first end of the dog-bone connector is adjustable in that direction. Thus, after positioning the condenser beneath the steam turbine, a misalignment of the condenser with respect to the steam turbine may be accommodated by retaining the second end of the dog-bone connector in the second clamp, and adjusting the position of the first portion of the first clamp to receive the first end of the dog-bone connector. In some embodiments, at least a portion of the first end of the dog-bone connector is deformed by the first clamp such that the dog-bone connector includes an asymmetric flat portion configured to facilitate retention of the dog-bone connector within the first clamp.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
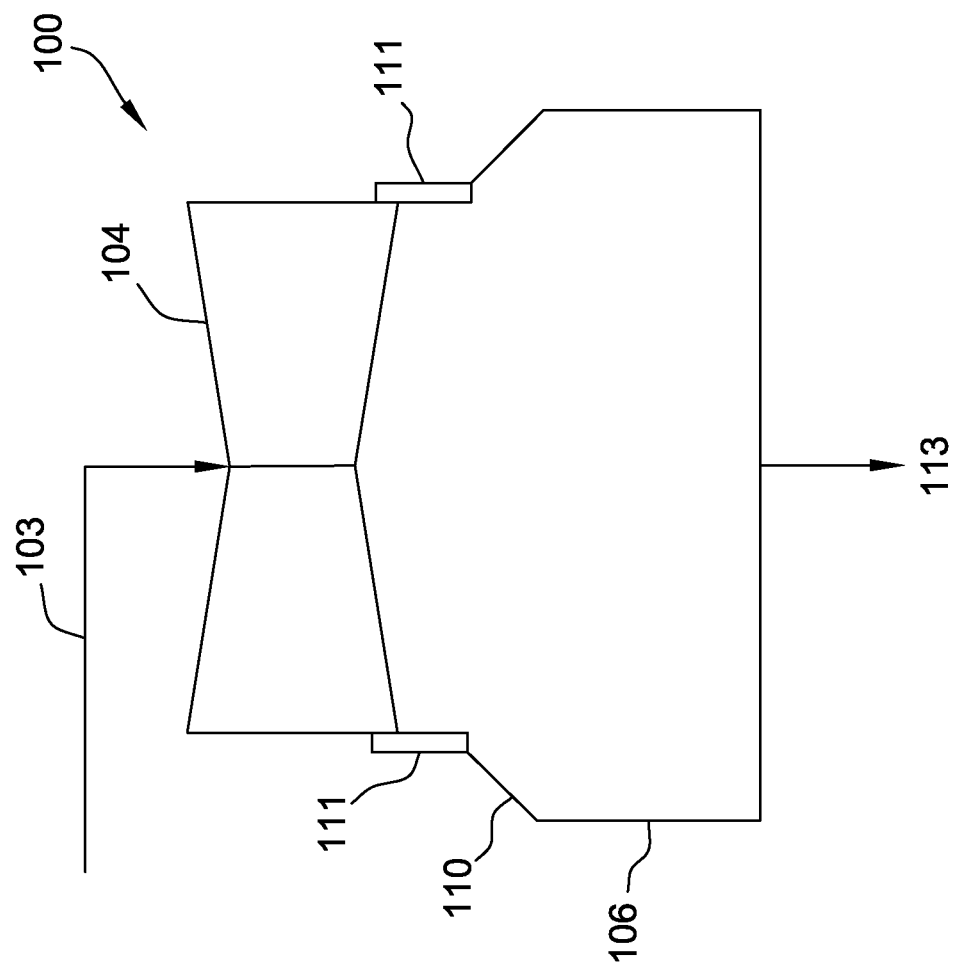
FIG. 1 is a schematic view of an exemplary steam turbine system.

FIG. 1 is a schematic view of an exemplary steam turbine system 100. Steam 103 is provided at an initially elevated pressure and temperature and is channeled in any suitable fashion to a steam turbine 104. In the exemplary embodiment, steam turbine 104 is an opposed-flow steam turbine. In alternative embodiments, steam turbine 104 is a single-flow steam turbine. Moreover, in the exemplary embodiment, steam turbine 104 is a low-pressure steam turbine, and steam 103 is channeled in succession through a high pressure steam turbine (not shown) and an intermediate pressure steam turbine (not shown) prior to being channeled to steam turbine 104 at a relatively decreased pressure and temperature. In alternative embodiments, steam 103 is channeled through any suitable arrangement and number, including zero, of steam turbines prior to steam turbine 104.

Steam turbine 104 converts thermal energy of steam 103 to mechanical rotational energy. For example, steam 103 impacts rotor blades of steam turbine 104 and induces rotation of a rotor of steam turbine 104. The rotational energy of the rotor may be used to drive a load (not shown) such as, but not limited to, an electrical generator or a mechanical drive application.

Steam turbine system 100 also includes a condenser 106 that receives steam 103 exhausted from steam turbine 104 and condenses the exhausted steam 103 to a stream of liquid water 113. In the exemplary embodiment, condenser 106 includes a condenser neck 110 that directs low pressure exhausted steam 103 to condenser 106 to be condensed. In alternative embodiments, condenser 106 is arranged in any suitable fashion, and/or is configured to condense the exhausted steam 103 in any suitable fashion, that enables steam turbine system 100 to function as described herein.

Condenser 106 is coupled to steam turbine 104 by a connection system 111. In the exemplary embodiment, connection system 111 extends along corresponding sides of steam turbine 104 and condenser neck 110. Connection system 111 facilitates expediently coupling steam turbine 104 to condenser 106 during assembly of steam turbine system 100 and facilitates relative movement of condenser 106 and steam turbine 104 during the coupling process to accommodate misalignment, as described below.

Figure 2:
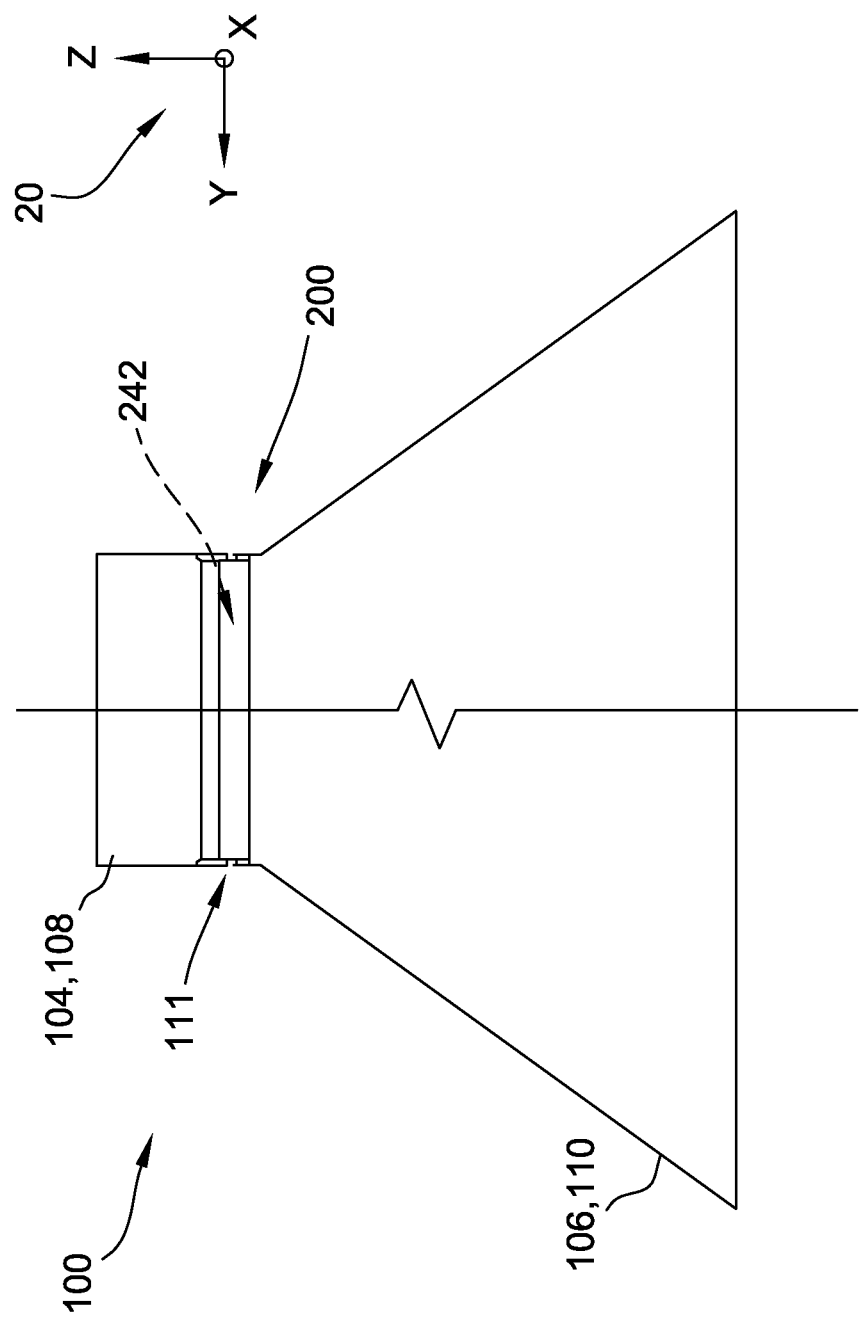
FIG. 2 is a perspective side view of a portion of an exemplary steam turbine and a portion of an exemplary condenser that may be used with the steam turbine system shown in FIG. 1 illustrating an exemplary connection system.
Figure 3:
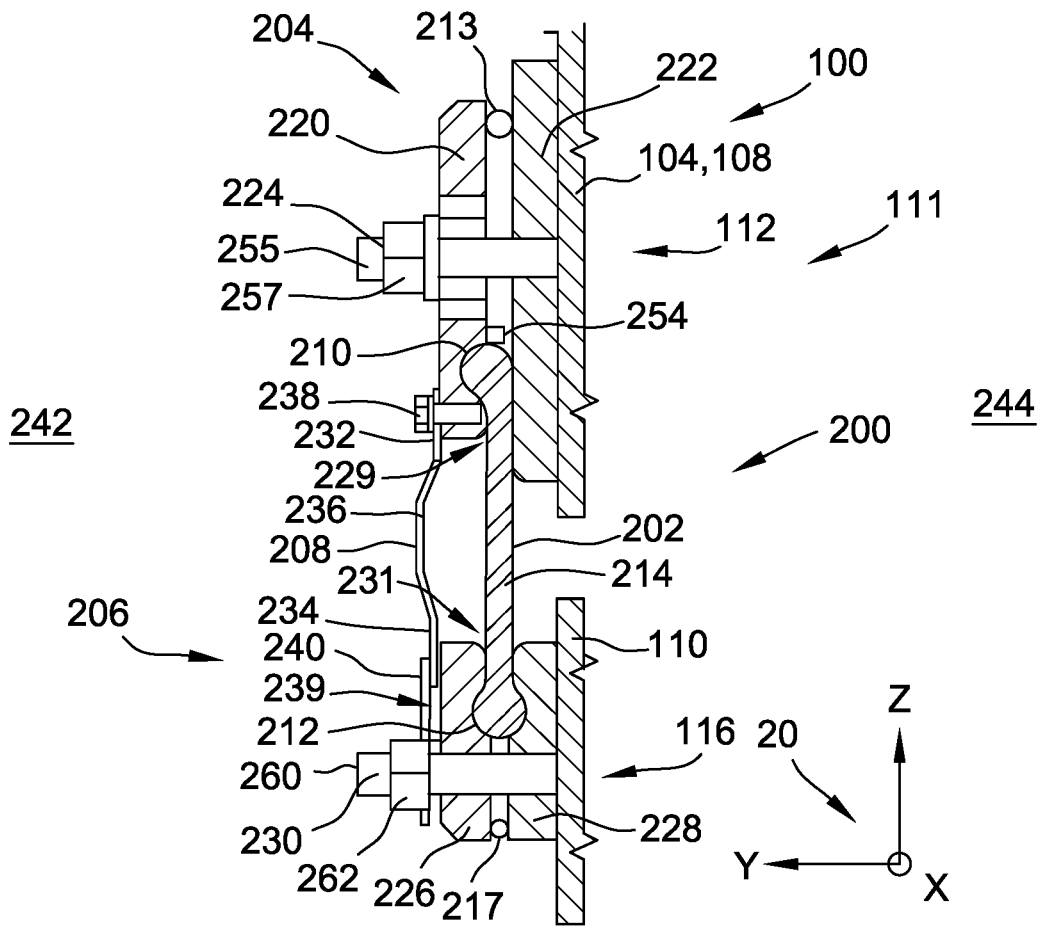
FIG. 3 is a cross-sectional view of the connection system shown in FIG. 2.

FIG. 2 is a perspective side view of a portion of steam turbine 104 and condenser 106 that may be used with steam turbine system 100 (shown in FIG. 1) illustrating exemplary connection system 111. FIG. 3 is a cross-sectional view of connection system 111. In the exemplary embodiment, connection system 111 forms a joint 200 between an outer casing 108 of steam turbine 104 and condenser neck 110, and includes a dog-bone connector 202, a first clamp 204, a second clamp 206, and a connection shield 208. It should be understood that in some certain embodiments, connection system 111 includes an extension coupled to steam turbine 104 and an extension coupled to condenser neck 110, forming joint 200 therebetween. Joint 200 separates an interior region 242, in which exhausted steam 103 flowing from steam turbine 104 to condenser neck 110 is present during operation of steam turbine system 100, from an exterior region 244. In alternative embodiments, connection system 111 is coupled between any two suitable portions of steam turbine 104 and condenser 106. Connection system 111 defines a coordinate system 20 including a first, horizontal X-axis defining a first direction parallel to joint 200, a second, lateral Y-axis defining a second direction extending from joint 200 towards interior region 242, and a third, vertical Z-axis defining a third direction, the three axes orthogonal to each other.

Figure 4:
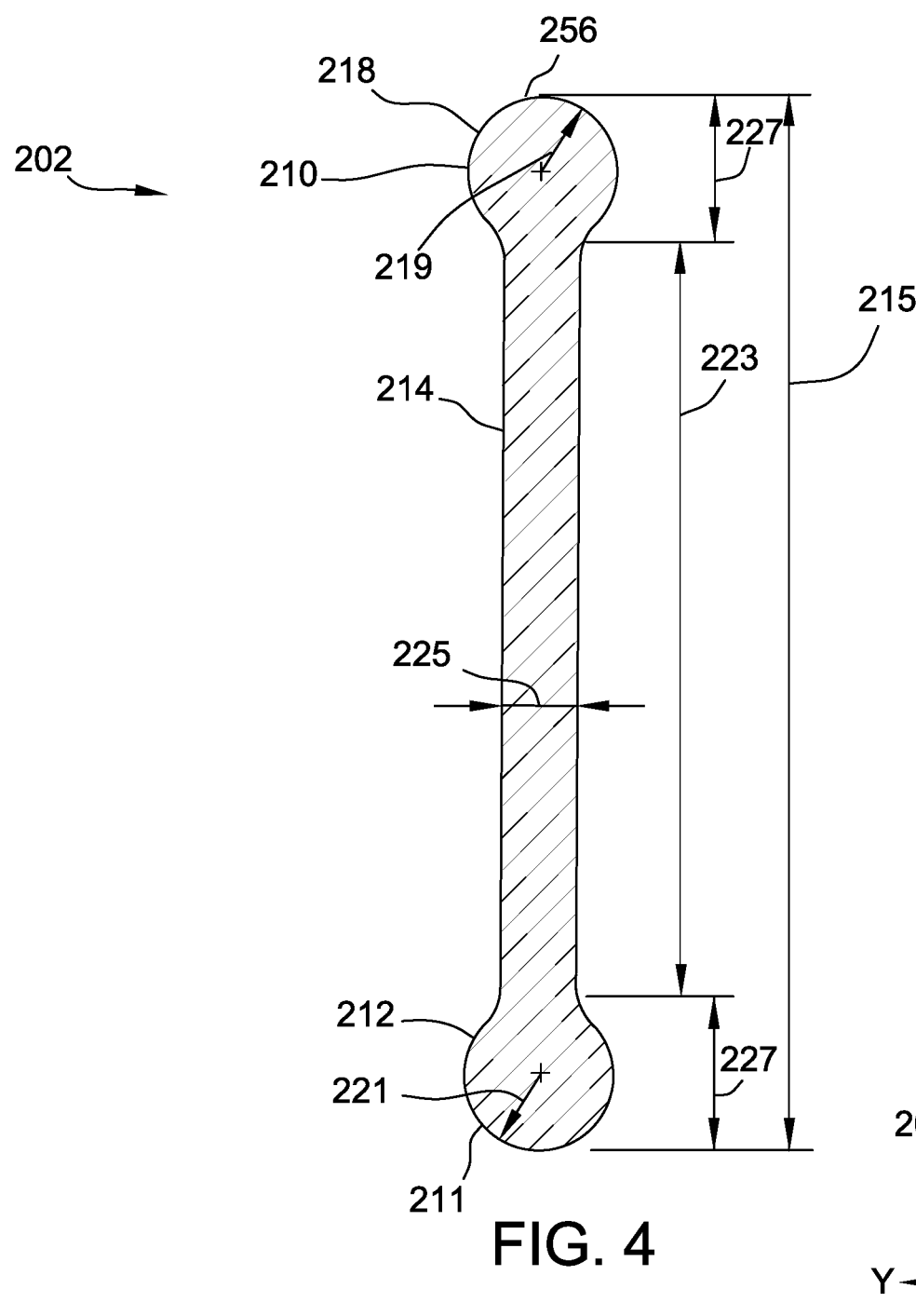
FIG. 4 is a cross-sectional view of an exemplary dog-bone connector that may be used with the connection system shown in FIG. 3.

FIG. 4 is a cross-sectional view of an exemplary embodiment of dog-bone connector 202 that may be used with connection system 111 (shown in FIG. 3). The term "dog-bone" as used herein refers to an object having a central elongated body with a lobe positioned at each end of the body, wherein at least a portion of each lobe is of a larger diameter than the body. In the exemplary embodiment, dog-bone connector 202 includes a first end 210, a second end 212, and a body 214 extending therebetween along the third direction by a dog-bone connector length 215. Body 214 has a body length 223, and has a profile in the second direction defined by a body thickness 225. In the exemplary embodiment, each of first end 210, second end 212, and body 214 extend in the first direction, i.e. perpendicular to the page in the view of FIG. 4, along an entirety of a respective side of joint 200. In alternative embodiments, each of first end 210, second end 212, and body 214 extend in the first direction to any suitable extent that enables connection system 111 to function as described herein. In the exemplary embodiment, first end 210 and second end 212 have end lengths 227 defined in the third direction. In alternative embodiments, first end 210, second end 212, and body 214 have any dimensions that enable operation of steam turbine system 100 as described herein.

In some embodiments, dog-bone connector first end 210 is symmetric and includes a first end curvilinear portion 218. In the exemplary embodiment, first end curvilinear portion 218 has a generally arcuate contour and defines a first end radius 219. In an alternative embodiment, dog-bone connector first end 210 is asymmetric. In further alternative embodiments, first end curvilinear portion 218 has any suitable contour that enables dog-bone connector 202 to function as described herein.

In the exemplary embodiment, dog-bone connector second end 212 is symmetric and includes a second end curvilinear portion 211. In the exemplary embodiment, second end curvilinear portion 211 has a generally arcuate contour and defines a second end radius 221. In alternative embodiments, second end curvilinear portion 211 has any suitable contour that enables dog-bone connector 202 to function as described herein.

In the exemplary embodiment, dog-bone connector 202 is resiliently deformable along a plurality of directions. More specifically, dog-bone connector 202 is fabricated from a material that has a first shape, is deformable to a second shape different from the first shape, and returns to the first shape without experiencing permanent deformation after the deforming forces are removed. In alternative embodiments, dog-bone connector 202 is formed from at least one of a neoprene material, a silicon rubber material, and a styrene butadiene rubber material having elastic properties. The resiliently deformable nature of dog-bone connector 202 further facilitates accommodation of misalignment between steam turbine 104 and condenser neck 110 by connection system 111. In further alternative embodiments, dog-bone connector 202 is formed from a non-resiliently deformable material. In additional alternative embodiments, dog-bone connector 202 is formed from a non-deformable material. In yet another alternative embodiment, dog-bone connector 202 is formed from any suitable material that enables connection system 111 to function as described herein. In some embodiments, first end 210 and second end 212 each include a strand of metal wire extending in the first direction along an entirety of joint 200. In other alternative embodiments, dog-bone connector 202 is configured in any suitable manner that enables connection system 111 to function as described herein.

Figure 5:
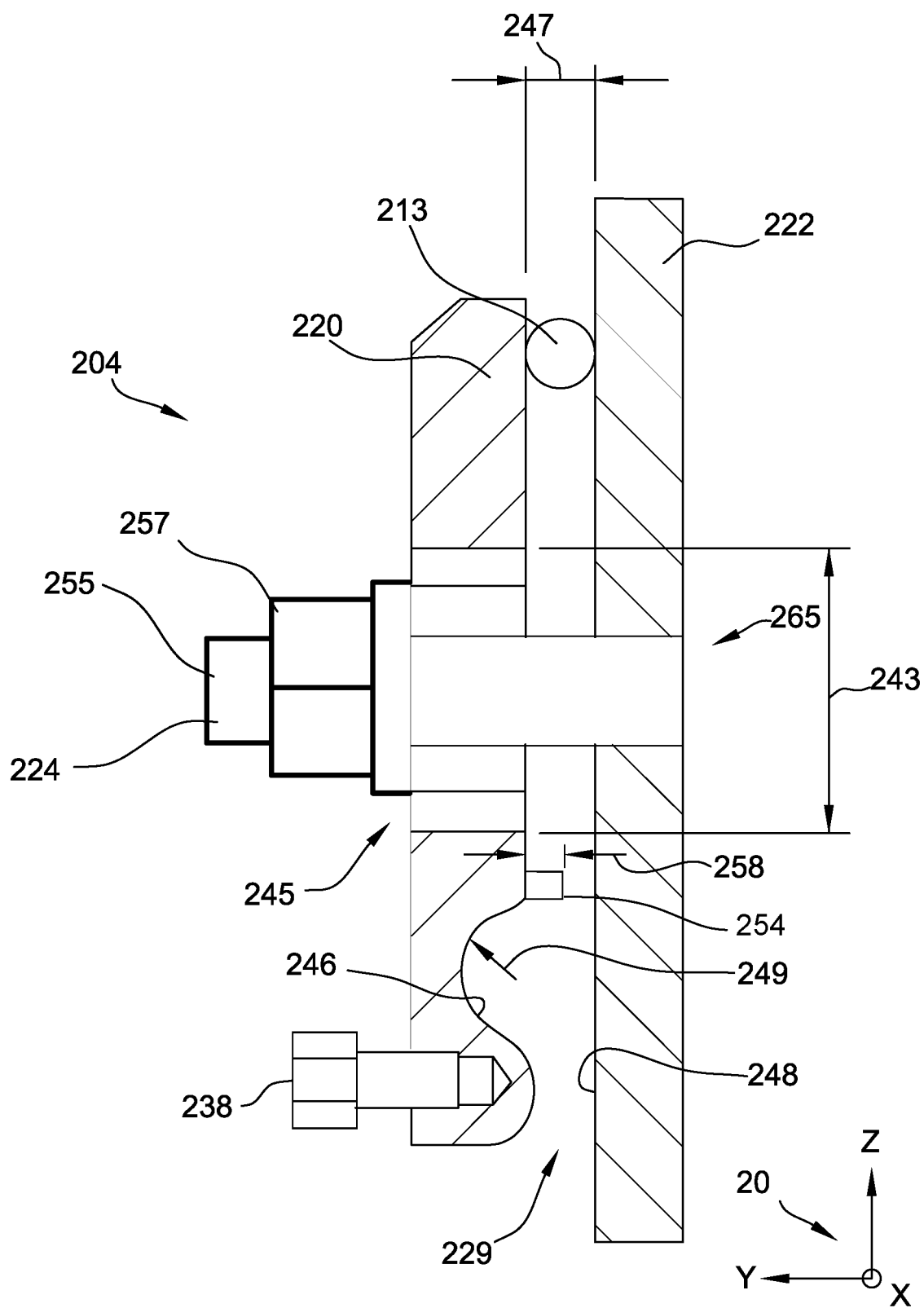
FIG. 5 is a cross-sectional view of an exemplary first clamp that may be used with the connection system shown in FIG. 3.

FIG. 5 is a cross-sectional view of an exemplary embodiment of first clamp 204. With reference to FIGS. 3-5, in the exemplary embodiment, first clamp 204 includes a first portion 220 and a second portion 222 coupled to first portion 220. First clamp 204 defines a first retention cavity 229 between first portion 220 and second portion 222. First retention cavity 229 is contoured complementarily to at least a portion of first end 210 of dog-bone connector 202 and is configured to retain first end 210 of dog-bone connector 202. A first gap 247 is defined between first and second portions 220, 222 parallel to the second direction. First clamp 204 is configured to couple to one of steam turbine 104 and condenser 106 such that first portion 220 is movable relative to second portion 222 along the third direction. More specifically, first gap 247 is sized to retain first end 210 of dog-bone connector 202 within contoured first retention cavity 229 such that first clamp 204 inhibits movement of first end 210 in the third direction. For purposes of illustration only, first clamp 204 will be described below as coupled to steam turbine 104. However, it should be understood that alternative embodiments in which first clamp 204 is coupled to condenser 106 are also encompassed herein and are understood to provide similar functions and benefits.

For example, in the exemplary embodiment, first portion 220 includes a curvilinear first retention surface 246, second portion 222 includes a flat second retention surface 248 facing first retention surface 246 across first gap 247, and first and second retention surfaces 246, 248 cooperate to define first retention cavity 229. More specifically, first retention surface 246 defines a first retention surface radius 249 complementary to first end radius 219, facilitating retention of at least a portion of first end curvilinear portion 218 of first end 210 for motion in the third direction with first portion 220. In the exemplary embodiment, flat second retention surface 248 facilitates deforming a portion of first end 210 such that the deformed portion of first end 210 is contoured complementary to second retention surface 248 and facilitates sliding motion of the deformed portion of first end 210 and body 214 along second retention surface 248 as first end 210 moves in the third direction with first portion 220 during assembly of connection system 111. In the exemplary embodiment, deformation of first end 210 within first retention cavity 229 facilitates forming an asymmetrical first end 210, facilitating retention of first end 210 within first retention cavity 229. In alternative embodiments, first and second portions 220, 222 define first retention cavity 229 in any suitable manner that enables connection system 111 to function as described herein.

Also in the exemplary embodiment, second portion 222 of first clamp 204 is welded to steam turbine 104. In alternative embodiments, second portion 222 of first clamp 204 may be attached to steam turbine using any means that facilitates operation of connection system 111 as described herein. First clamp 204 includes a first fastener 224 receivable through first portion 220 and second portion 222 such that first clamp 204 and steam turbine 104 are coupled together. More specifically, first portion 220 defines a first through-hole 245 extending in the second direction through first portion 220 and second portion 222 defines a second through-hole 265 extending in the second direction through second portion 222. First through-hole 245 is elongated along the third direction over a length 243 that is greater than a diameter of first fastener 224, such that first portion 220 is movable along the third direction, with respect to second portion 222 and steam turbine 104, after first fastener 224 is installed through first through-hole 245 and into second through-hole 265. Moreover, installed first fastener 224 maintains first gap 247 sized to retain first end 210 of dog-bone connector 202 within first retention cavity 229 as first portion 220 moves with respect to second portion 222, without binding first end 210 against movement in the third direction. Notably, flat portion 216 of first end 210 facilitates slidable adjustment of the position of non-deformed first end 210 of dog-bone connector 202 in the third direction along second portion 222 during assembly of connection system 111.

In the exemplary embodiment, first fastener 224 includes a first threaded stud 255 and a first nut 257. First threaded stud 255 is receivable through first through-hole 245 and engageable with threads (not shown) in second through-hole 265, and first nut 257 is threadably advanceable along first threaded stud 255 such that a distance between first nut 257 and second portion 222 is decreased until a preselected width of first gap 247 is obtained. In other words, tightening of first nut 257 causes first portion 220 to advance towards second portion 222, enabling the preselected width of first gap 247 to be obtained. In alternative embodiments, first fastener 224 and first and second portions 220, 222 are configured to cooperate in any suitable fashion to couple first clamp 204 to steam turbine 104. For example, in some embodiments, first threaded stud 255 is receivable through a through-hole in steam turbine 104 and engageable with threads therein. In other alternative embodiments, first clamp 204 and steam turbine 104 are coupled together in any suitable fashion that enables connection system 111 to function as described herein.

In the exemplary embodiment, a first spacer 213 is positioned between first portion 220 and second portion 222 and is configured to facilitate maintaining the preselected width of first gap 247 defined between first portion 220 and second portion 222. In the exemplary embodiment, first spacer 213 is a cylindrical rod having a diameter substantially similar to the preselected width of first gap 247 and extending in the first direction, i.e. perpendicular to the page in the view of FIG. 4, along an entirety of a respective side of joint 200. Additionally, first spacer 213 facilitates maintaining a parallel relationship between first portion 220 and second portion 222 when first end 210 has been received within first retention cavity 229. In the exemplary embodiment, first spacer 213 is formed from a steel alloy. In alternative embodiments first spacer 213 is formed from any suitable material that enables steam turbine system 100 to function as described herein.

Figure 6:
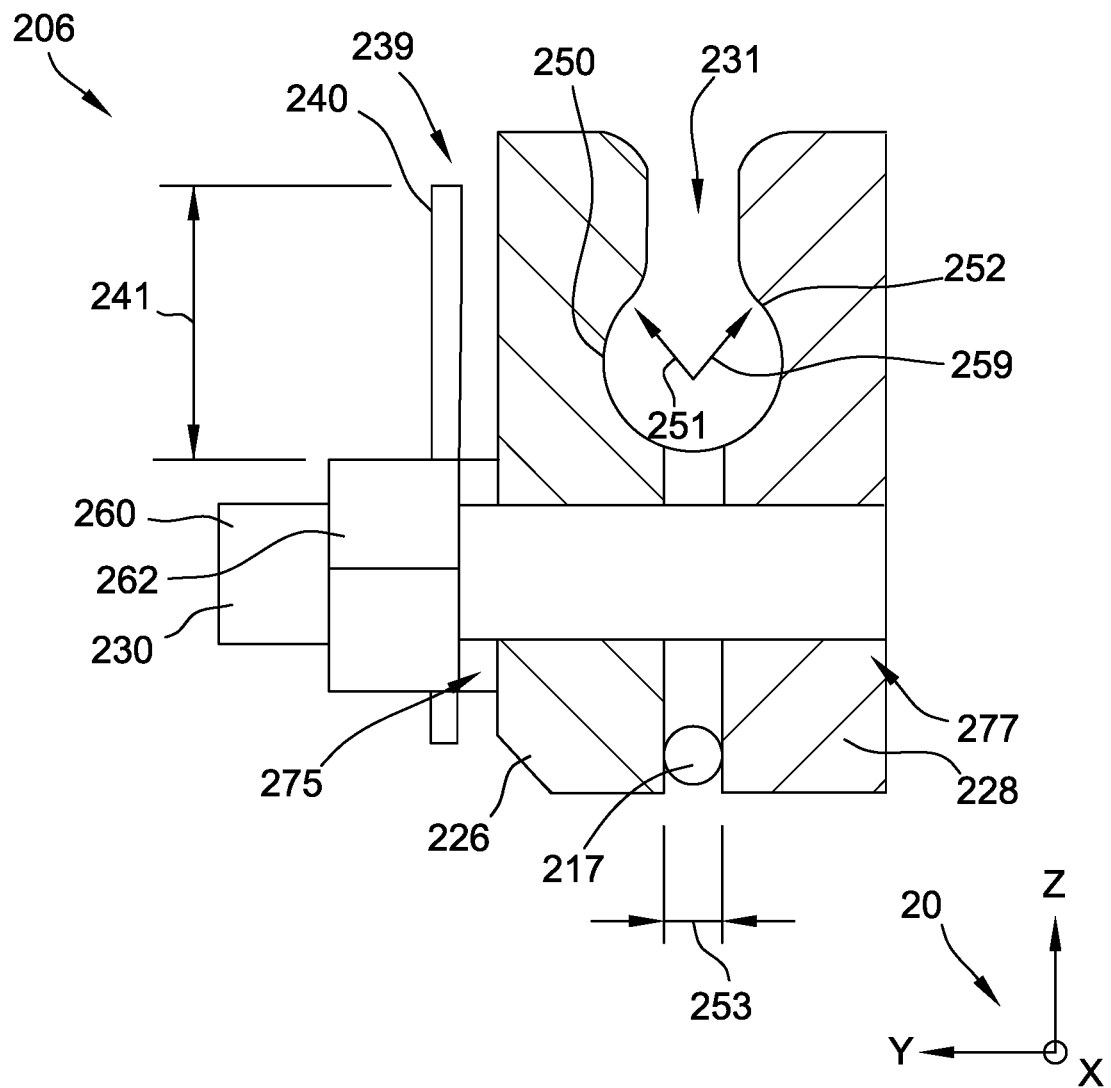
FIG. 6 is a cross-sectional view of an exemplary second clamp that may be used with the connection system shown in FIG. 3.

FIG. 6 is a cross-sectional view of exemplary embodiment of second clamp 206. With reference to FIGS. 3, 4, and 6, in the exemplary embodiment, second clamp 206 includes a third portion 226 and a fourth portion 228 coupled to third portion 226. Second clamp 206 is configured to couple to the other of steam turbine 104 and condenser 106, that is, the one of steam turbine 104 and condenser 106 to which first clamp 204 is not coupled. Consistent with the illustration of first clamp 204 coupled to steam turbine 104 as noted above, for purposes of illustration only, second clamp 206 will be described below as coupled to condenser 106. However, it should be understood that alternative embodiments in which second clamp 206 is coupled to steam turbine 104 are also encompassed herein and are understood to provide similar functions and benefits.

Second clamp 206 defines a second retention cavity 231 between third portion 226 and fourth portion 228. Second retention cavity 231 is contoured complementarily to second end 212 of dog-bone connector 202 and is configured to retain second end 212 of dog-bone connector 202. A second gap 253 is defined between third and fourth portions 226, 228 parallel to the second direction. Second clamp 206 is configured to couple to condenser 106 such that third portion 226 is fixed relative to fourth portion 228 and steam turbine 104. More specifically, second gap 253 is sized to retain second end 212 of dog-bone connector 202 within contoured second retention cavity 231 such that second clamp 206 binds second end 212 against movement in the third direction.

For example, in the exemplary embodiment, third portion 226 includes a curvilinear third surface 250, fourth portion 228 includes a curvilinear fourth surface 252 facing third surface 250 across second gap 253, and third and fourth surfaces 250, 252 cooperate to define second retention cavity 231. More specifically, third surface 250 defines a third surface radius 251 complementary to second end radius 221 and fourth surface 252 defines a fourth surface radius 259 also complementary to second end radius 221, facilitating retention of second end curvilinear portion 211 of second end 212 against motion relative to second clamp 206 and condenser neck 110. In alternative embodiments, third and fourth portions 226, 228 define second retention cavity 231 in any suitable manner that enables connection system 111 to function as described herein. In the exemplary embodiment, fourth portion 228 of second clamp 206 is welded to condenser neck 110. In alternative embodiments, fourth portion 228 of second clamp 206 may be attached to condenser neck 110 using any means that facilitates operation of connection system 111 as described herein.

Also in the exemplary embodiment, second clamp 206 further includes a second fastener 230 receivable through third portion 226 and fourth portion 228 and further receivable by condenser neck 110, such that second clamp 206 and condenser neck 110 are coupled together. More specifically, third portion 226 defines a third through-hole 275 extending in the second direction through third portion 226, fourth portion 228 defines a fourth through-hole 277 extending in the second direction through fourth portion 228, and condenser neck 110 defines an opening 116 extending in the second direction at least partially into condenser neck 110 and aligned with third through-hole 275 and fourth through-hole 277. Installed second fastener 230 maintains second gap 253 sized to retain second end 212 of dog-bone connector 202 within second retention cavity 231, binding second end 212 against movement in the third direction.

In the exemplary embodiment, second fastener 230 includes a second threaded stud 260 and a second nut 262. Second threaded stud 260 is receivable through third through-hole 275 and fourth through-hole 277 and engageable with threads (not shown) in fourth through-hole 277, and second nut 262 is threadably advanceable along second threaded stud 260 such that a distance between second nut 262 and fourth portion 228 is decreased until a preselected width of second gap 253 is obtained. In other words, tightening of second nut 262 causes third portion 226 to advance towards fourth portion 228, enabling the preselected width of second gap 253 to be obtained. In alternative embodiments, second fastener 230 and third and fourth portions 226, 228 are configured to cooperate in any suitable fashion to couple second clamp 206 to condenser neck 110. For example, in some embodiments, second threaded stud 260 is receivable through a through-hole in condenser neck 110 and engageable with threads therein. In other alternative embodiments, second clamp 206 and condenser neck 110 are coupled together in any suitable fashion that enables connection system 111 to function as described herein.

In the exemplary embodiment, a second spacer 217 is positioned between third portion 226 and fourth portion 228 and is configured to facilitate maintaining a preselected width of second gap 253 defined between third portion 226 and fourth portion 228. In the exemplary embodiment, second spacer 217 is a cylindrical rod having a diameter substantially similar to the preselected width of second gap 253 and extending in the first direction, i.e. perpendicular to the page in the view of FIG. 4, along an entirety of a respective side of joint 200. Additionally, second spacer 217 facilitates maintaining a parallel relationship between third portion 226 and fourth portion 228 when second end 212 has been received within second retention cavity 231. In the exemplary embodiment, second spacer 217 is formed from a steel alloy. In alternative embodiments, second spacer 217 is formed from any suitable material that enables steam turbine system 100 to function as described herein.

With reference to FIGS. 3, 5, and 6, in the exemplary embodiment, connection system 111 further includes a shield 208 oriented to isolate dog-bone connector 202, and portions of first clamp 204 and second clamp 206 defining first and second retention cavities 229 and 231, from exhausted steam 103 in interior region 242. Shield 208 is oriented for exposure to interior region 242 of joint 200 between first clamp 204 and second clamp 206 and is configured to resist abrasive effects of exhausted steam 103 exiting steam turbine 104 and entering condenser 106. In alternative embodiments, shield 208 is oriented for exposure to exterior region 244 between first clamp 204 and second clamp 206. In further alternative embodiments, shield 208 is oriented with respect to interior region 242 and exterior region 244 in any suitable fashion that enables steam turbine system 100 to function as described herein.

In the exemplary embodiment, shield 208 includes a first, secured leg 232, a second, sliding leg 234, and a center section 236. Shield 208 is fixedly coupled to first portion 220 by at least one shield fastener 238 extending though first leg 232. Thus, a position of shield 208 is adjustable in the third direction, along with first portion 220, with respect to second clamp 206. Shield 208 extends in the third direction from first clamp 204 to second clamp 206. More specifically, second leg 234 of shield 208 is positioned for movement within a shield retention cavity 239 defined between third portion 226 and a shield retainer 240 coupled to third portion 226. Shield retention cavity 239 extends along the third direction by a cavity length 241 sufficient to retain second leg 234 after the position of second leg 234 is adjusted along the third direction. Thus, shield 208 is positioned to inhibit exhausted steam 103 from interior region 242 from reaching dog-bone connector 202, and from reaching portions of first clamp 204 and second clamp 206 defining first and second retention cavities 229 and 231. In alternative embodiments, shield 208 is configured in any suitable fashion that enables shield 208 to function as described herein. In other alternative embodiments, connection system 111 does not include shield 208.

In the exemplary embodiment, first clamp 204 further includes a fixation shoulder 254 extending from first portion 220 towards second portion 222. Fixation shoulder 254 is configured to interface with dog-bone connector 202 to inhibit movement of first end 210 of dog-bone connector 202 in the third direction relative to first portion 220. More specifically, in the exemplary embodiment, fixation shoulder 254 is configured to obstruct translation of a top portion 256 (shown in FIG. 4) of first end 210 of dog-bone connector 202 upward, with respect to the view of FIG. 3, along the third direction relative to first portion 220. In some embodiments, fixation shoulder 254 facilitates inhibiting first end 210 from slipping upward out of first retention cavity 229 during adjustment of first portion 220 in the third direction. In other embodiments, fixation shoulder 254 inhibits a portion of first end 210 from deforming along the third direction out of first retention cavity 229 when first portion 220 is being drawn closer to second portion 222 and is compressing first end 210. Fixation shoulder 254 extends from first portion 220 towards second portion 222 by a fixation shoulder thickness 258, and is sized such that fixation shoulder thickness 258 does not prevent first clamp 204 from being drawn together such that the desired width of first gap 247 is obtained. In alternative embodiments, fixation shoulder 254 is configured in any suitable fashion that enables fixation shoulder 254 to function as described herein. In other alternative embodiments, first clamp 204 does not include fixation shoulder 254.

Figure 7:
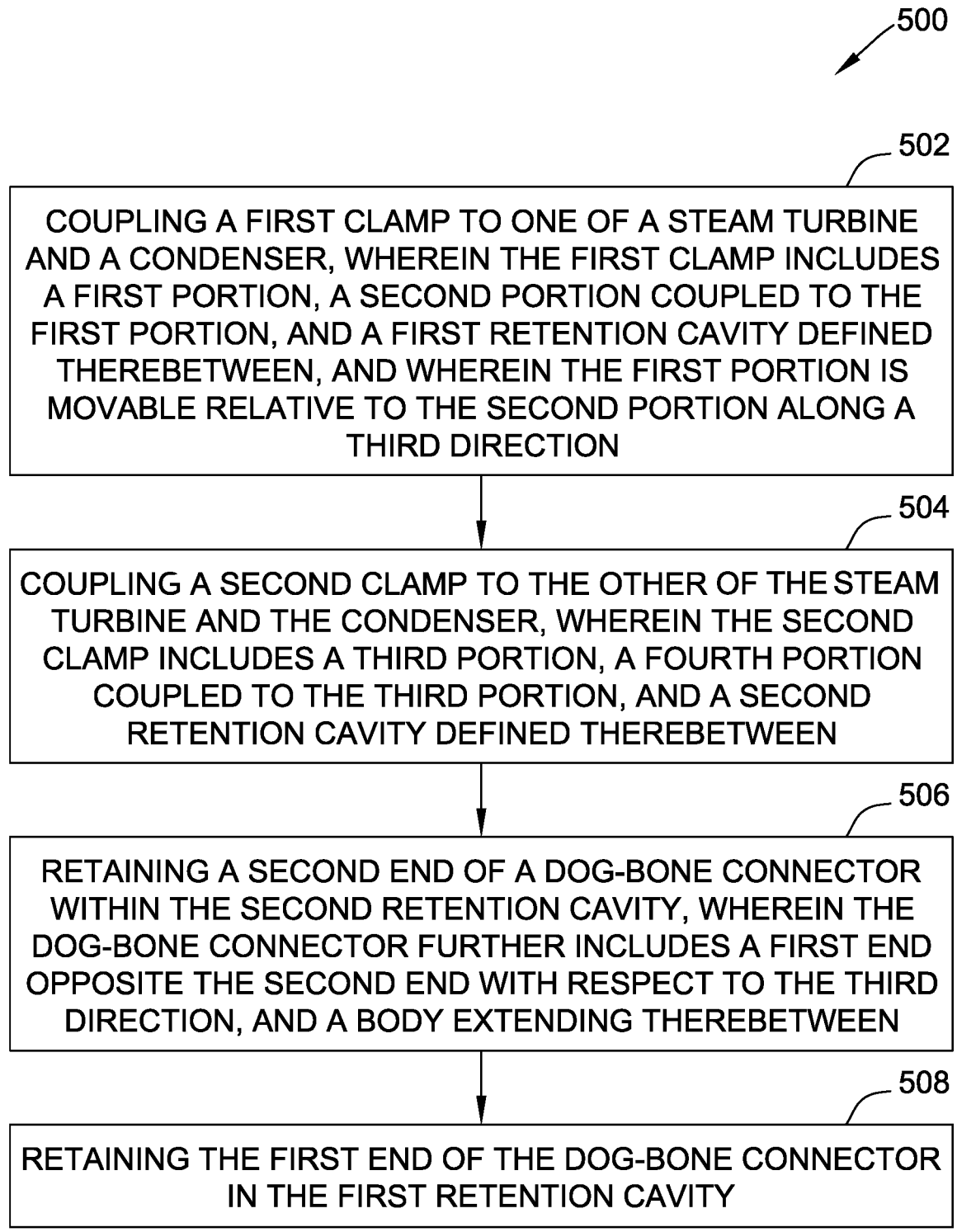
FIG. 7 is a flow diagram of an exemplary method for connecting a steam turbine to a condenser using a connection system, such as the connection system shown in FIG. 2.

FIG. 7 is a flow diagram of an exemplary method 500 for coupling a steam turbine, such as steam turbine 104, to a condenser, such as condenser 106, using a connection system, such as connection system 111 (shown in FIG. 2). The connection system defines a first direction, a second direction, and a third direction as described above. With reference to FIGS. 1-7, method 500 includes coupling 502 a first clamp, such as first clamp 204, to one of the steam turbine and the condenser. The first clamp includes a first portion, such as first portion 220, a second portion, such as second portion 222, coupled to the first portion, and a first retention cavity defined therebetween, such as first retention cavity 229. The first portion is movable relative to the second portion along the third direction. Method 500 also includes coupling 504 a second clamp, such as second clamp 206, to the other of the steam turbine and the condenser. The second clamp includes a third portion, such as third portion 226, a fourth portion, such as fourth portion 228, coupled to the third portion, and a second retention cavity defined therebetween, such as second retention cavity 231. Method 500 further includes retaining 506 a second end of a dog-bone connector, such as second end 212 of dog-bone connector 202, within the second retention cavity. The dog-bone connector further includes a first end opposite the second end with respect to the third direction, such as first end 210, and a body extending therebetween, such as body 214. Finally, method 500 includes retaining 508 the first end of the dog-bone connector in the first retention cavity.

In some embodiments, the step of coupling 502 first clamp 204 includes coupling second portion 222 of first clamp 204 to steam turbine 104, for example, at a position along the third direction that corresponds to a predicted location of first end 210 of dog-bone connector 202. For example, the predicted location of first end 210 is calculated based on an assumption of zero tolerance stack-up, shrinkage or distortion of previous welds, and/or other sources of misalignment. In some such embodiments, method 500 also includes condenser 106 being assembled at a location off-line from assembly of steam turbine 104, in parallel to the assembly of steam turbine 104. Condenser 106 is subsequently positioned, in a substantially fully assembled condition, beneath steam turbine 104. The step of coupling 504 second clamp 206 to condenser 106 occurs at this time. In the event misalignment of first end 210 of dog-bone connector 202 is discovered, the step of retaining 508 first end 210 of dog-bone connector 202 in first retention cavity 229 includes adjusting the position of first portion 220 along the third direction, relative to second portion 222 and steam turbine 104, in order to accommodate the actual position of first end 210. In certain embodiments, the ability to position condenser 106 in fully assembled form with respect to steam turbine 104, and accommodate any misalignment using connection system 111 with no final welding step to complete the connection, enables assembly and adjustment of steam turbine 104, including pouring of additional elements of the foundation under the steam turbine table, to occur independently of the timeline of assembling condenser 106 and coupling condenser 106 to steam turbine 104. For example, because the final step of coupling dog-bone connector 202 to first clamp 204 does not involve welding and resulting shrinkages, a clearance between the rotor and the inner casing of steam turbine 104 does not need to be readjusted in response to coupling condenser 106 to steam turbine 104.

The above-described embodiments overcome at least some of the disadvantages of known connection systems for coupling steam turbines to condensers within steam turbine systems. Specifically, the embodiments include a first clamp coupled to one of the steam turbine and the condenser and configured to retain a first end of the dog-bone connector, and a second clamp coupled to the other of the steam turbine and the condenser and configured to retain a second end of the dog-bone connector. A first portion of the first clamp is movable relative to a second portion along one (e.g., vertical) direction, such that a position of the retention cavity for the first end of the dog-bone connector is adjustable in that direction. Thus, after positioning the condenser beneath the steam turbine, a misalignment of the condenser with respect to the steam turbine may be accommodated by fixedly retaining the second end of the dog-bone connector in the second clamp, and adjusting the position of the first portion of the first clamp to receive the first end of the dog-bone connector. Also specifically, in some embodiments, the first end of the dog-bone connector is configured to be deformable by the first clamp such that a deformed portion of the first end of the dog-bone connector includes an asymmetric, flat portion configured to facilitate retention of the dog-bone connector within the first clamp. Also specifically, in certain embodiments, because the connection system accommodates any misalignment with no re-levelling and/or no final welding step to complete the connection, assembly and adjustment of the steam turbine, including pouring of additional elements of the foundation under the steam turbine table, occurs independently of the timeline of assembling the condenser and coupling the condenser to the steam turbine, thereby eliminating as much as several weeks of down-time from the schedule for assembling the steam turbine system.

Exemplary embodiments of a connection system, and steam turbine systems and methods incorporating the connection system, are described above in detail. The systems and methods are not limited to the specific embodiments described herein, but rather, components of systems and/or steps of methods may be utilized independently and separately from other components and/or steps described herein. For example, the connection system may also be used in combination with other machines and methods, and is not limited to practice with only a steam turbine system as described herein. Rather, the embodiments can be implemented and utilized in connection with many other applications.

Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to illustrate the disclosure and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A connection system for coupling a steam turbine to a condenser, said connection system defining a first direction, a second direction, and a third direction, the three directions orthogonal to each other, said connection system comprising:
   a resiliently deformable dog-bone connector comprising a curvilinear symmetrical first end, a second end opposite said first end with respect to the third direction, and a body extending therebetween;
   a first clamp comprising a first portion, a second portion coupled to said first portion, and a first retention cavity defined therebetween, wherein said first portion comprises a first curvilinear retention surface contoured complementary to a portion of said dog-bone connector first end and said second portion comprises a flat second retention surface which facilitates deforming another portion of the first end such that the deformed portion of the first end is contoured complimentary to the second retention surface, wherein said first and second retention surfaces cooperate to define said first retention cavity, and wherein said first clamp is configured to couple to one of the steam turbine and the condenser such that said first portion is movable relative to said second portion along the third direction and said first end is configured to slide in the third direction along said second retention surface; and
   a second clamp configured to couple to the other of the steam turbine and the condenser and comprising a third portion, a fourth portion coupled to said third portion, and a second retention cavity defined therebetween, wherein said second retention cavity is contoured complementarily to said second end of said dog-bone connector.

2. The connection system according to claim 1, wherein said first portion comprises a first through-hole extending therethrough in the second direction and elongated in the third direction, and said first clamp further comprises a first fastener configured to be received through said first through-hole such that said first clamp and the one of the steam turbine and the condenser are coupled together.

3. The connection system according to claim 1, wherein said second end is symmetrical, said third portion comprises a third retention surface contoured complementary to a portion of said dog-bone connector second end, and said fourth portion comprises a fourth retention surface contoured complementary to another portion of said dog-bone connector second end, and wherein said third and fourth retention surfaces cooperate to define said second retention cavity.

4. The connection system according to claim 1, wherein said first portion comprises a fixation shoulder extending from said first portion towards said second portion, said fixation shoulder configured to interface with said first end of said dog-bone connector such that movement of said dog-bone connector relative to said first clamp is inhibited.

5. The connection system according to claim 1 further comprising:
   a first spacer positioned between said first portion and said second portion, wherein said first spacer is configured to facilitate maintaining a first gap between said first portion and said second portion, and wherein said first spacer is configured to facilitate maintaining a parallel relationship between said first portion and said second portion; and
   a second spacer positioned between said third portion and said fourth portion, wherein said second spacer is configured to facilitate maintaining a second gap between said third portion and said fourth portion, and wherein said second spacer is configured to facilitate maintaining a parallel relationship between said third portion and said fourth portion.

6. The connection system according to claim 1 further comprising a shield fixedly coupled to one of said first and second clamps and extending along the third direction between said first and second clamps, said shield coupled to the other of said first and second clamps for movement in the third direction with respect to said other of said first and second clamps.

7. A steam turbine system comprising:
   a steam turbine;
   a condenser configured to receive steam exhausted from said steam turbine, said condenser comprising a condenser neck; and
   a connection system for coupling said steam turbine to said condenser neck, said connection system defining a first direction, a second direction, and a third direction, the three directions orthogonal to each other, said connection system comprising:
- a resiliently deformable dog-bone connector comprising a curvilinear symmetrical first end, a second end opposite said first end with respect to the third direction, and a body extending therebetween;
- a first clamp coupled to one of said steam turbine and said condenser neck, said first clamp comprising a first portion, a second portion coupled to said first portion, and a first retention cavity defined therebetween, wherein said first end of said dog-bone connector is retained in said first retention cavity, wherein said first portion comprises a first curvilinear retention surface contoured complementary to a portion of said dog-bone connector first end and said second portion comprises a flat second retention surface which facilitates deforming another portion of the first end such that the deformed portion of the first end is contoured complimentary to the second retention surface, wherein said first and second retention surfaces cooperate to define said first retention cavity, and wherein said first portion is movable relative to said second portion along the third direction and said first end is configured to slide in the third direction along said second retention surface; and
- a second clamp coupled to the other of said steam turbine and said condenser neck and comprising a third portion, a fourth portion coupled to said third portion, and a second retention cavity defined therebetween, wherein said second end of said dog-bone connector is retained in said second retention cavity.

8. The steam turbine system according to claim 7, wherein said first portion comprises a first through-hole extending therethrough in the second direction and elongated in the third direction, and said first clamp further comprises a first fastener received through said first through-hole such that said first clamp and said one of said steam turbine and said condenser neck are coupled together.

9. The steam turbine system according to claim 7, wherein said second end is symmetrical, said third portion comprises a third retention surface contoured complementary to a portion of said dog-bone connector second end, and said fourth portion comprises a fourth retention surface contoured complementary to another portion of said dog-bone connector second end, and wherein said third and fourth retention surfaces cooperate to define said second retention cavity.

10. The steam turbine system according to claim 7, wherein said first portion comprises a fixation shoulder extending from said first portion towards second portion, said fixation shoulder configured to interface with said first end of said dog-bone connector such that movement of said dog-bone connector relative to said first clamp is inhibited.

11. The steam turbine system according to claim 7 further comprising:
- a first spacer positioned between said first portion and said second portion, wherein said first spacer is configured to facilitate maintaining a first gap between said first portion and said second portion, and wherein said first spacer is configured to facilitate maintaining a parallel relationship between said first portion and said second portion; and
- a second spacer positioned between said third portion and said fourth portion, wherein said second spacer is configured to facilitate maintaining a second gap between said third portion and said fourth portion, and wherein said second spacer is configured to facilitate maintaining a parallel relationship between said third portion and said fourth portion.

12. The steam turbine system according to claim 7 further comprising a shield fixedly coupled to one of said first and second clamps and extending along the third direction between said first and second clamps, said shield coupled to the other of said first and second clamps for movement in the third direction with respect to said other of said first and second clamps.

13. A method of coupling a steam turbine to a condenser using a connection system, the connection system defining a first direction, a second direction, and a third direction, the three directions orthogonal to each other the said method comprising:
- coupling a first clamp to one of the steam turbine and the condenser, wherein the first clamp includes a first portion, a second portion coupled to the first portion, and a first retention cavity defined therebetween, and wherein the first portion is movable relative to the second portion along the third direction;
- coupling a second clamp to the other of the steam turbine and the condenser, wherein the second clamp includes a third portion, a fourth portion coupled to the third portion, and a second retention cavity defined therebetween;
- retaining a second end of a resiliently deformable dog-bone connector within the second retention cavity, wherein the dog-bone connector further includes a curvilinear symmetrical first end opposite the second end with respect to the third direction, and a body extending therebetween; and
- retaining the first end of the dog-bone connector in the first retention cavity; wherein said first portion comprises a first curvilinear retention surface contoured complementary to a portion of said dog-bone connector first end and said second portion comprises a flat second retention surface which facilitates deforming another portion of the first end such that the deformed portion of the first end is contoured complementary to the second retention surface, wherein said first and second retention surfaces cooperate to define said first retention cavity and said first end is configured to slide in the third direction along said second retention surface.

14. The method according to claim 13, wherein coupling the first clamp to the one of the steam turbine and the condenser comprises installing a first fastener, wherein the first fastener is received through a first through-hole, the first through-hole extending through the first portion in the second direction and elongated in the third direction.

15. The method according to claim 13 further comprising:
- positioning a first spacer between the first portion and the second portion, wherein the first spacer is configured to facilitate maintaining a first gap between said first portion and the second portion, and wherein the first spacer is configured to facilitate maintaining a parallel relationship between the first portion and the second portion; and
- positioning a second spacer between the third portion and the fourth portion, wherein the second spacer is configured to facilitate maintaining a second gap between the third portion and the fourth portion, and wherein the second spacer is configured to facilitate maintaining a parallel relationship between the third portion and the fourth portion.

16. The method of claim 13 further comprising:
fixedly coupling a shield to one of the first and second clamps such that the shield extends along the third direction between the first and second clamps; and
coupling the shield to the other of the first and second clamps for movement in the third direction with respect to the other of the first and second clamps.

* * * * *